United States Patent
Mohajerani

(10) Patent No.: US 7,369,368 B1
(45) Date of Patent: May 6, 2008

(54) HEAD STACK ASSEMBLY HAVING AN ACTUATOR BODY WITH MULTIPLE SLOTS ADJACENT TO A BORE

(75) Inventor: Khosrow Mohajerani, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 391 days.

(21) Appl. No.: 10/966,552

(22) Filed: Oct. 15, 2004

(51) Int. Cl.
*G11B 21/08* (2006.01)

(52) U.S. Cl. ............ 360/266; 360/265.2; 360/265.6; 360/265.7; 360/265.9; 360/266.1

(58) Field of Classification Search ............ 360/265.2, 360/265.6, 265.7, 265.9, 266, 266.1
See application file for complete search history.

(56) References Cited

U.S. PATENT DOCUMENTS

| | | | |
|---|---|---|---|
| 4,249,221 A | 2/1981 | Cox et al. | |
| 4,797,762 A | 1/1989 | Levy et al. | |
| 5,268,805 A * | 12/1993 | Peng et al. | ............... 360/266 |
| 5,329,412 A | 7/1994 | Stefansky | |
| 5,488,523 A | 1/1996 | Seaver et al. | |
| 5,559,650 A | 9/1996 | Repphun et al. | |
| 5,621,590 A * | 4/1997 | Pace et al. | ............... 360/244.6 |
| 5,636,081 A | 6/1997 | Higashiya et al. | |
| 5,748,409 A * | 5/1998 | Girard et al. | ............... 360/245 |
| 5,757,588 A | 5/1998 | Larson | |
| 5,815,348 A * | 9/1998 | Danielson et al. | ....... 360/244.9 |
| 5,898,537 A | 4/1999 | Oizumi et al. | |
| 6,288,879 B1 | 9/2001 | Misso et al. | |
| 6,342,388 B1 | 1/2002 | Van Den Wildenberg | |
| 6,552,311 B2 | 4/2003 | Watanabe | |
| 6,693,767 B1 | 2/2004 | Butler | |
| 2003/0081356 A1* | 5/2003 | Shimizu et al. | .......... 360/265.9 |
| 2003/0169537 A1* | 9/2003 | Weichelt et al. | ......... 360/265.9 |
| 2003/0218833 A1* | 11/2003 | Nagahiro et al. | ........ 360/265.9 |
| 2005/0185326 A1 | 8/2005 | Bruner et al. | |

FOREIGN PATENT DOCUMENTS

DE        4315288 A1 * 11/1994

* cited by examiner

*Primary Examiner*—Andrea Wellington
*Assistant Examiner*—Carlos E Garcia
(74) *Attorney, Agent, or Firm*—Barcelo & Harrison LLP

(57) ABSTRACT

A head stack assembly for a disk drive includes an actuator body. The actuator body includes a pair of sides, a bore defining a longitudinal axis, a first slot extending between the pair of sides, a second slot extending along a direction perpendicular to the longitudinal axis, the second slot extending from the first slot to the bore. The head stack assembly further includes a coil portion cantilevered from the actuator body in one direction and an actuator arm cantilevered from the actuator body in a direction opposite from the coil portion.

6 Claims, 2 Drawing Sheets

HEAD STACK ASSEMBLY HAVING AN ACTUATOR BODY WITH MULTIPLE SLOTS ADJACENT TO A BORE

BACKGROUND OF THE INVENTION

1. Field of the Invention

This invention relates to a head stack assembly used in a disk drive. More particularly, this invention relates to a head stack assembly having an actuator body with multiple slots adjacent to its bore.

2. Description of the Prior Art and Related Information

A huge market exists for disk drives such as hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 40 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

The rotary actuator arrangement typically includes a head stack assembly having an actuator body, at least one actuator arm extending from the actuator body, a head gimbal assembly attached to the actuator arm, a coil portion extending from the actuator body in a direction opposite from the actuator arm, and a flex circuit cable assembly.

The head stack assembly may also include a bearing assembly which is fitted around a corresponding rotary actuator shaft on the base allowing the head stack assembly to pivot. The bearing assembly is disposed in a bore of the actuator body, the bore being cylindrically shaped.

The bearing assembly may be attached to the actuator body using various techniques. Some of the techniques require the use of an extra part in addition to the bearing assembly, such as a side screw, a tolerance ring or a C clip retainer ring, which adds to the cost of manufacturing disk drives. Another technique for attaching the bearing assembly to the actuator body is the use of a press fit operation in which the bearing assembly is pressed into the bore thereby resulting in an interference fit between the outer bearing assembly surface and the actuator body's inner cylindrical surface which defines the bore. During such a press fit operation, the outer bearing assembly surface may be deformed which in turn may result in a detenting of the bearing races. The detenting of the bearing races increases friction between the bearing balls and the races.

SUMMARY OF THE INVENTION

This invention can be regarded as a head stack assembly for a disk drive, including an actuator body. The actuator body includes a pair of sides, a bore defining a longitudinal axis, a first slot extending between the pair of sides, a second slot extending along a direction perpendicular to the longitudinal axis, the second slot extending from the first slot to the bore. The head stack assembly further includes a coil portion cantilevered from the actuator body in one direction and an actuator arm cantilevered from the actuator body in a direction opposite from the coil portion.

This invention can also be regarded as a disk drive including a base, a spindle motor attached to the base, a disk positioned on the spindle motor, and a head stack assembly coupled to the base. The head stack assembly includes an actuator body. The actuator body includes a pair of sides, a bore defining a longitudinal axis, a first slot extending between the pair of sides, a second slot extending along a direction perpendicular to the longitudinal axis, the second slot extending from the first slot to the bore. The head stack assembly further includes a coil portion cantilevered from the actuator body in one direction and an actuator arm cantilevered from the actuator body in a direction opposite from the coil portion.

DETAILED DESCRIPTION

Figure 1:
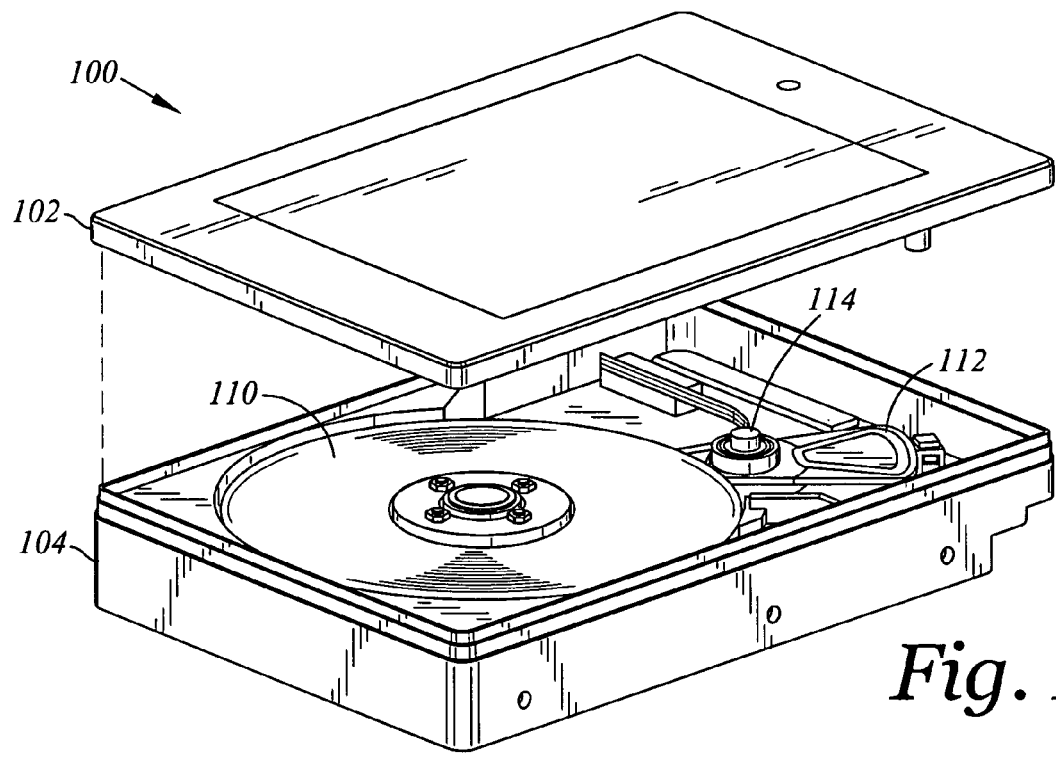
FIG. 1 is a perspective view of a disk drive incorporating an embodiment of this invention.

With reference to FIGS. 1, 2, 3a, and 3b, a disk drive 100 includes a base 104, a spindle motor 106 attached to base 104, a disk 110 positioned on spindle motor 106, and a head stack assembly 112 coupled to base 104. Head stack assembly 112 includes an actuator body 118. Actuator body 118 includes a pair of sides 122, 124, a bore 120 defining a longitudinal axis, a first slot 126 extending between pair of sides 122,124, a second slot 128 extending along a direction perpendicular to the longitudinal axis, second slot 128 extending from first slot 126 to bore 120. Head stack assembly 112 further includes a coil portion 130 cantilevered from actuator body 118 in one direction and an actuator arm 134 cantilevered from actuator body 118 in a direction opposite from coil portion 130.

Figure 2:
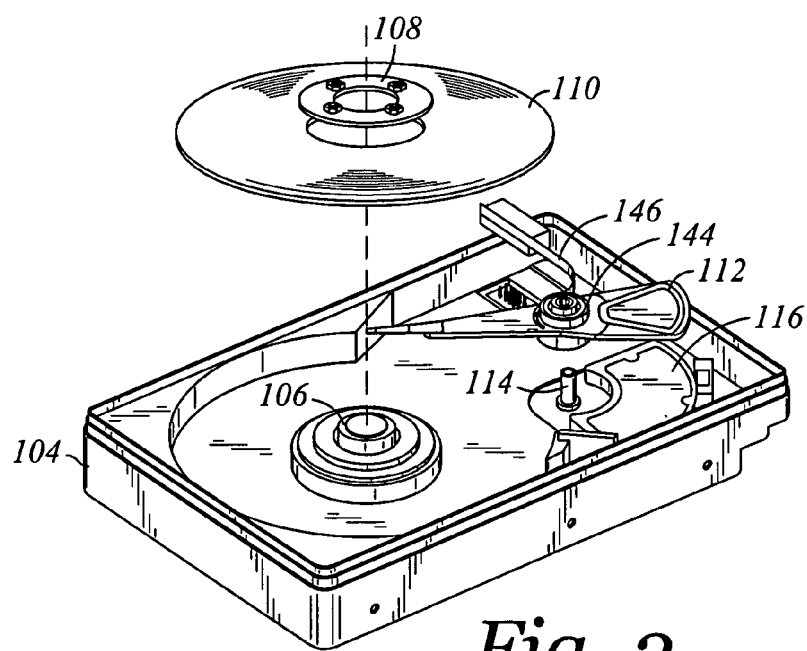
FIG. 2 is a perspective view of a portion of the disk drive shown in FIG. 1.

Continuing with FIGS. 1 and 2, disk drive 100 further includes a cover 102 for attachment to base 104, a disk clamp 108 for clamping disk 110 to spindle motor 106, and a voice coil motor magnet assembly 116. Base 104 includes an actuator shaft 114 about which head stack assembly 112 pivots after head stack assembly 112 is suitably attached to actuator shaft 114. Head stack assembly 112 further includes a bearing assembly 144 and a flex circuit cable assembly 146.

Figure 3A:
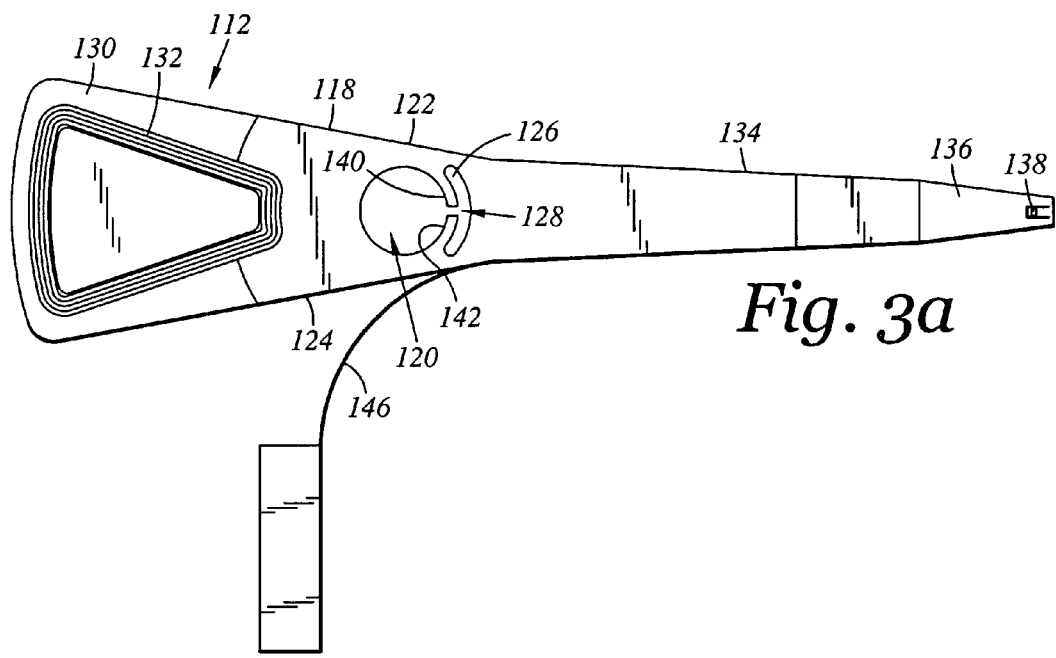
FIG. 3a is a plan view of the head stack assembly of FIG. 1 with the bearing assembly removed.

Continuing with FIG. 3a, head stack assembly 112 is shown with its bearing assembly 144 removed. Head stack assembly 112 further includes an actuator coil 132, a load beam 136 attached to actuator arm 134, and a magnetic head 138 attached to load beam via a suitable gimbal (not shown). In one embodiment, bore 120 and first 126 and second 128 slots collectively define a pair of independently flexible actuator body segments 140, 142. In one embodiment, first slot 126 is arcuately shaped.

Figure 3B:
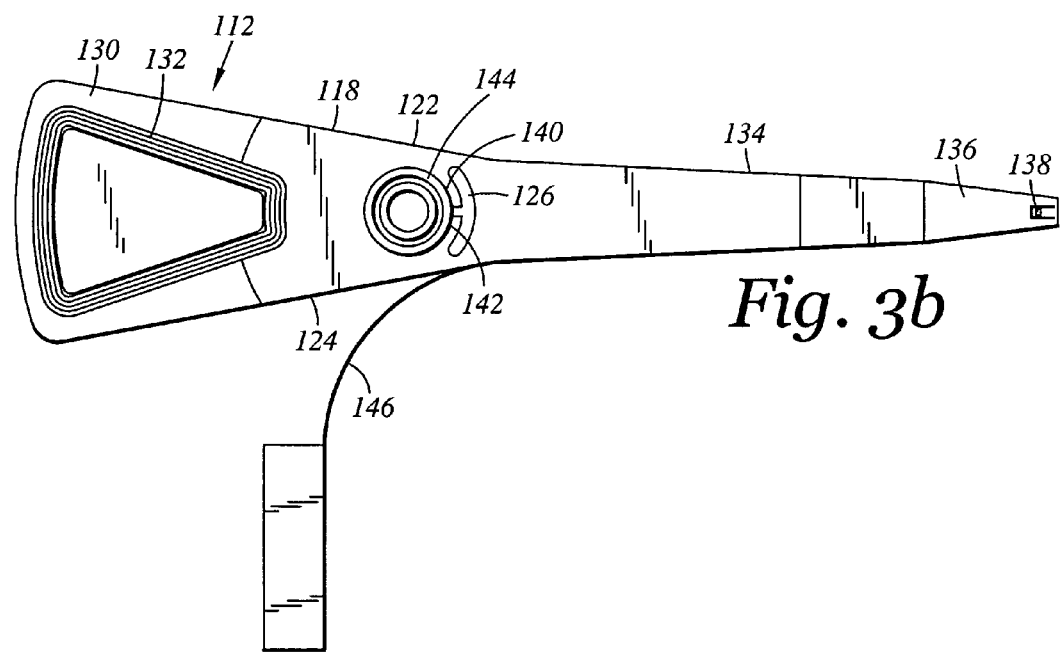
FIG. 3b is a plan view of the head stack assembly of FIG. 1.

Continuing with FIG. 3b, head stack assembly 112 is shown with bearing assembly 144 fitted into bore 120, bore 120 defining a longitudinal axis as mentioned above. Such a longitudinal axis, also known as a "pivot axis," is generally defined by the center of bore 120 and is an axis extending in a direction perpendicular to the plane of the paper. Bearing assembly 144 may be fitted into bore 120 via a press fit operation, according to one embodiment. During such a press fit operation, flexible actuator body segments 140,142 flex outwardly in view of first 126 and second slots 128. In another embodiment, bearing assembly 144 may be fitted into bore 120 via a shrink fit operation in which actuator body 118 is heated causing bore 120 to expand. Subsequently, bearing assembly 144 is fitted into bore 120 and actuator body 118 is allowed to cool thereby contracting bore 120 such that bearing assembly 144 is attached to bore 120. In one embodiment, bearing assembly 144 may have a generally cylindrically shaped outer surface for attachment to actuator body 118. In another embodiment, bearing assembly 144 may have a step adjacent to a top bearing of bearing assembly 144 such that actuator body 118 rests on the step. In one embodiment, first 126 and second slots 128 may be formed by a stamping process. In an alternative embodiment, first 126 and second 128 slots may be formed by a machining process. While the embodiment shown in FIGS. 3a and 3b show an arcuately shaped first slot 126, other shapes may be used such as a rectangularly shaped slot. In an alternative embodiment, head stack assembly 112 may have multiple magnetic heads in which case additional actuator arms would extend from an actuator body defining first and second slots.

The invention claimed is:

1. A head stack assembly for a disk drive, comprising:
an actuator body including:
  a pair of sides;
  a bore defining a longitudinal axis;
  a first slot extending between the pair of sides;
  a second slot extending along a direction perpendicular to the longitudinal axis, the second slot extending from the first slot to the bore;
  a coil portion cantilevered from the actuator body in one direction;
an actuator arm cantilevered from the actuator body in a direction opposite from the coil portion;
at least one load beam attached to the actuator arm; and
a bearing assembly fitted into the bore,
wherein the bore and the first and second slots collectively define a pair of independently flexible actuator body segments, and wherein each of the independently flexible actuator body segments includes a supported end adjoining a remainder of the actuator body, and a free end, and wherein both the supported end and the free end are in contact with the bearing assembly.

2. A disk drive comprising:
a base;
a spindle motor attached to the base;
a disk positioned on the spindle motor;
a head stack assembly coupled to the base;
the head stack assembly including:
  an actuator body including:
    a pair of sides;
    a bore defining a longitudinal axis;
    a first slot extending between the pair of sides;
    a second slot extending along a direction perpendicular to the longitudinal axis, the second slot extending from the first slot to the bore;
    a coil portion cantilevered from the actuator body in one direction;
  an actuator arm cantilevered from the actuator body in a direction opposite from the coil portion;
  at least one load beam attached to the actuator arm; and
  a bearing assembly fitted into the bore,
  wherein the bore and the first and second slots collectively define a pair of independently flexible actuator body segments, and wherein each of the independently flexible actuator body segments includes a supported end adjoining a remainder of the actuator body, and a free end, and wherein both the supported end and the free end are in contact with the bearing assembly.

3. A head stack assembly for a disk drive, comprising:
an actuator body including:
  a pair of sides;
  a bore defining a longitudinal axis;
  a first slot extending between the pair of sides;
  a second slot extending along a direction perpendicular to the longitudinal axis, the second slot extending from the first slot to the bore;
  a coil portion cantilevered from the actuator body in one direction;
an actuator arm cantilevered from the actuator body in a direction opposite from the coil portion; and
at least one load beam attached to the actuator arm,
wherein the second slot opens into the bore and the bore has a generally circular cross section that is interrupted where the second slot opens into the bore.

4. The head stack assembly of claim 3, wherein the second slot opens into the first slot at a generally orthogonal intersection between the second slot and the first slot.

5. A disk drive comprising:
a base;
a spindle motor attached to the base;
a disk positioned on the spindle motor;
a head stack assembly coupled to the base;
the head stack assembly including:
  an actuator body including:
    a pair of sides;
    a bore defining a longitudinal axis;
    a first slot extending between the pair of sides;
    a second slot extending along a direction perpendicular to the longitudinal axis, the second slot extending from the first slot to the bore;
    a coil portion cantilevered from the actuator body in one direction;
  an actuator arm cantilevered from the actuator body in a direction opposite from the coil portion; and
  at least one load beam attached to the actuator arm,
  wherein the second slot opens into the bore and the bore has a generally circular cross section that is interrupted where the second slot opens into the bore.

6. The disk drive of claim 5, wherein the second slot opens into the first slot at a generally orthogonal intersection between the second slot and the first slot.

* * * * *